(12) United States Patent
Chestnut

(10) Patent No.: US 6,691,688 B1
(45) Date of Patent: Feb. 17, 2004

(54) NITROUS PLATE SYSTEM FOR FUEL INJECTED ENGINES

(75) Inventor: Daniel W. Chestnut, Los Angeles, CA (US)

(73) Assignee: Edelbrock Corporation, Torrance, CA (US)

( * ) Notice: Subject to any disclaimer, the term of this patent is extended or adjusted under 35 U.S.C. 154(b) by 0 days.

(21) Appl. No.: 10/425,010

(22) Filed: Apr. 29, 2003

(51) Int. Cl.[7] .............................................. F02B 23/00
(52) U.S. Cl. ...................................................... 123/585
(58) Field of Search .............................. 123/585, 586, 123/590

(56) References Cited

U.S. PATENT DOCUMENTS

| | | | | |
|---|---|---|---|---|
| 5,743,241 A | * | 4/1998 | Wood et al. | 123/531 |
| 5,839,418 A | | 11/1998 | Grant | 123/585 |
| 6,269,805 B1 | * | 8/2001 | Wilson | 123/585 |
| 6,520,165 B1 | | 2/2003 | Steele | 123/590 |
| 6,561,172 B1 | * | 5/2003 | Chestnut et al. | 123/585 |

OTHER PUBLICATIONS

Nitrous Oxide Systems Co., Product Catalog 2001, p. 19., USA.

* cited by examiner

Primary Examiner—Bibhu Mohanty
(74) Attorney, Agent, or Firm—Ronald M. Goldman

(57) ABSTRACT

A tunable nitrous plate assembly for fuel injected 5.0 liter V8 engines contains a metal plate (1) that is sandwiched between the upper and lower manifold members of the engine air intake manifold. The plate contains multiple ports (17) mate with the ports in the lower manifold member and, thereby, lead to individual intake runners of the engine cylinders. Each port includes a nitrous oxide spray conduit (21) overlying a fuel spray conduit (23) with both conduits extending across the port transverse to the longitudinal plate axis. Fittings (22, 20) attached to the plate exterior couple an end of respective spray conduits for fluid communication with appropriate nitrous oxide and fuel supplies. Replaceable calibration jets (45, 46) installed in respective fittings (22, 20) in series with the supply lines are selected so that the horsepower generated by the engine cylinders is balanced.

13 Claims, 3 Drawing Sheets

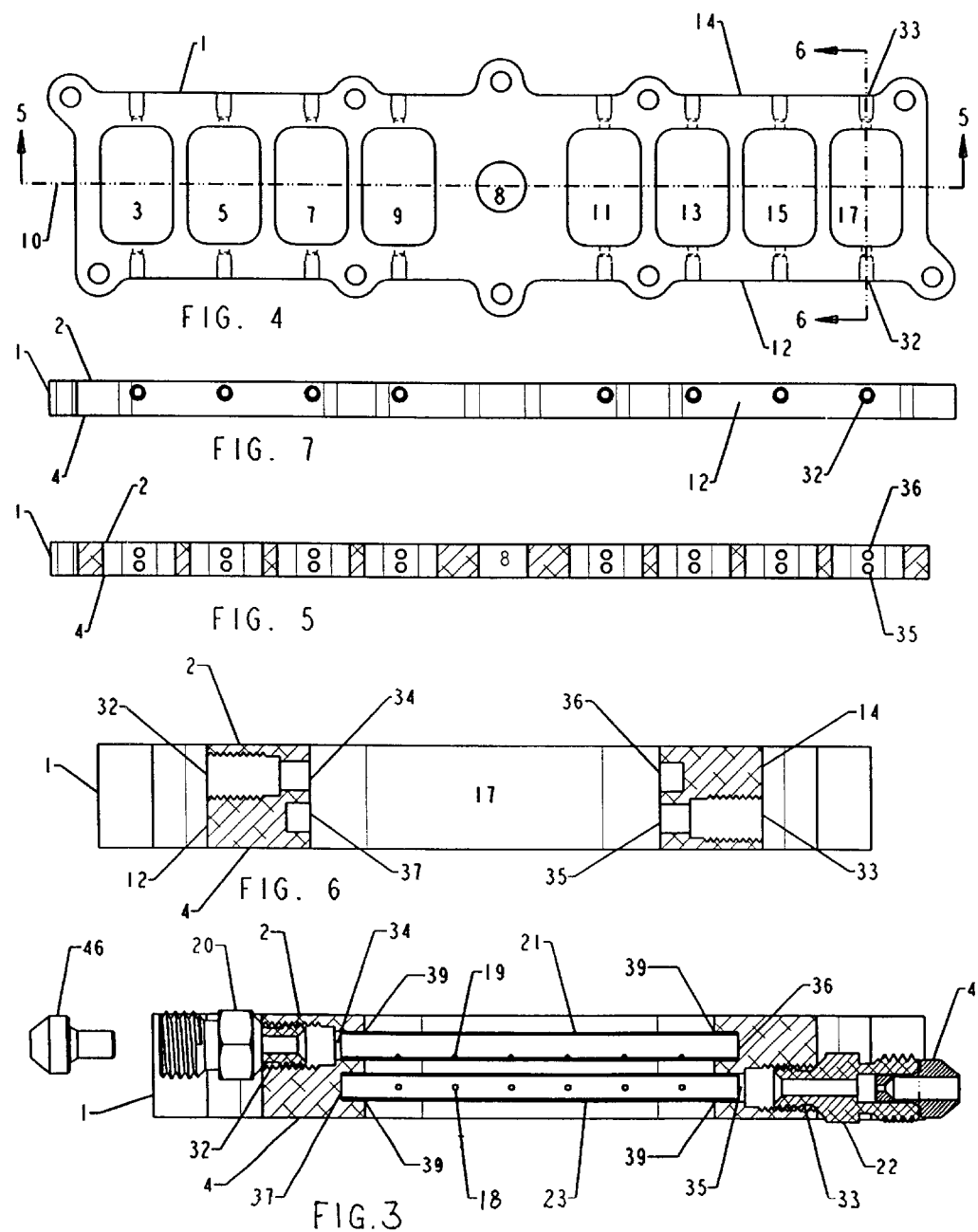

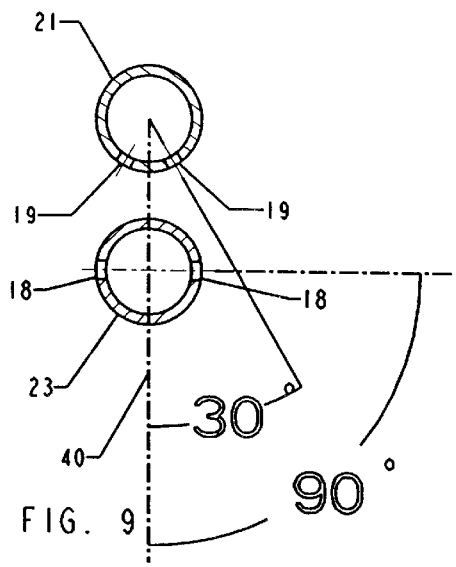
FIG. 9
FIG. 8
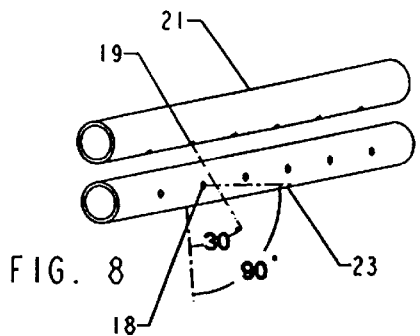
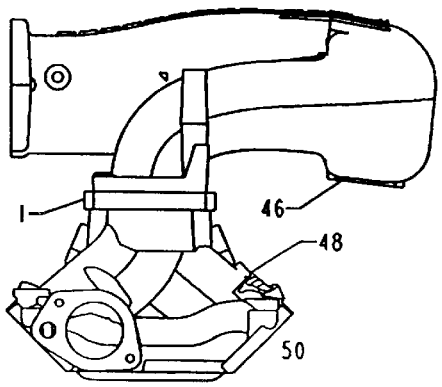
FIG. 10
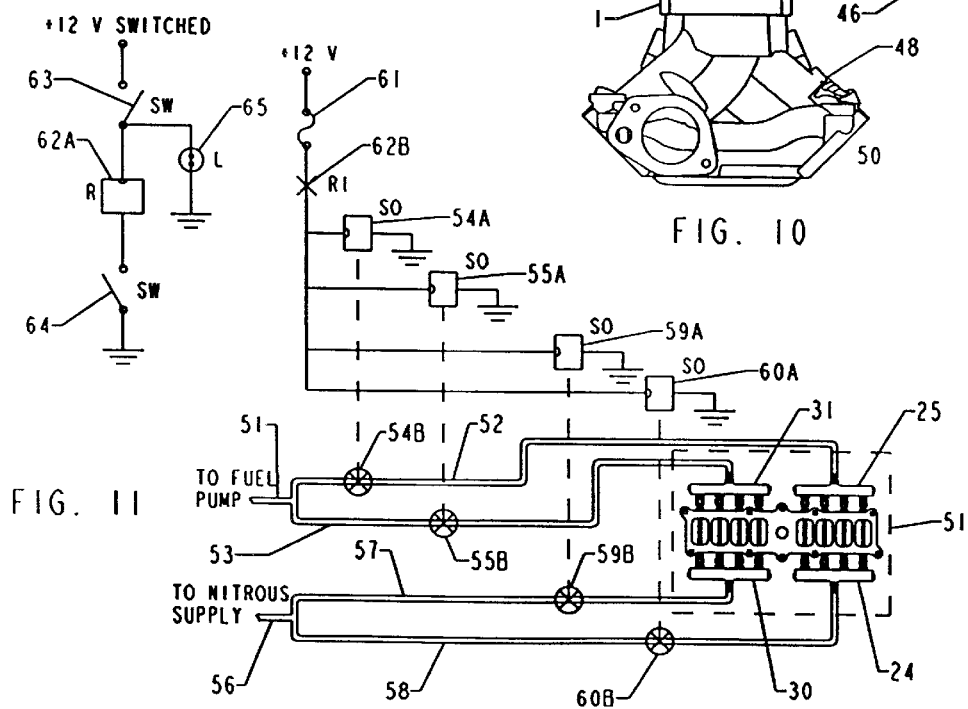
FIG. 11

NITROUS PLATE SYSTEM FOR FUEL INJECTED ENGINES

REFERENCE TO RELATED APPLICATIONS

The present application is related to the prior application of Chestnut et al. Ser. No. 10/039,939, filed Oct. 25, 2001, entitled Nitrous Oxide Plate System for Engines, copending herewith, of which the present application is a continuation-in-part. Applicant claims the benefit of 35 U.S.C. 120 with respect to the foregoing application.

FIELD OF THE INVENTION

This invention relates to nitrous oxide fuel systems for fuel injected internal combustion engines, and, more particularly, to a nitrous oxide plate system for fuel injected engines that enables more rapid generation of more horsepower and optimizes balance of the engine cylinders.

BACKGROUND

Many automobile enthusiasts labor long and hard to ensure that their prize possession, their automobile, is able to make a respectable showing in competitive quarter mile races. To accomplish that objective, the enthusiast needs to ensure that the automobile engine is able to rapidly generate the highest horsepower possible of which the engine is capable in the shortest time.

In a conventionally fueled internal combustion engine, vaporized fuel, such as gasoline or alcohol, is introduced through a carburetor and mixes with air drawn into the engine manifold to form a combustible mix. The combustible mix is drawn through an intake runner of the manifold and, ultimately, into a cylinder of the engine in which the combustible mix is ignited by the spark produced at the spark plug in the cylinder. The resultant explosion inside the combustion chamber of the cylinder produces the mechanical force on a piston. The forced movement of the piston is ultimately mechanically transferred through the transmission to the wheels of the automobile, which propels the automobile. That combustion process repeats for each cylinder in the engine.

A fuel injected engine, on the other hand, doesn't employ a carburetor to form the combustible fuel and oxygen mix. Instead, the outside air is drawn into the engine through an air intake manifold and is individually distributed to the multiple engine cylinders by individual intake air runners. Fuel injectors are located in the runner near the intake valve of the respective cylinders. The injectors receive fuel via a fuel line. At the appropriate point in the engine cycle, the injector associated with a given cylinder injects a measured amount of fuel into the associated intake runner at a location adjacent the cylinder. That injected fuel mixes with the air drawn to that region through the runner to form the combustible mix, which is drawn through an open intake valve into the cylinder combustion chamber. During the compression cycle, that mix is ignited by the cylinder spark plug. The force of the resultant explosion in the cylinder drives the cylinder piston. Typically the multiple fuel injectors in a multi-cylinder engine are individually computer controlled, which provides much better control of combustion than available with those engines employing carburetors. It is noted that fuel is not always present in the intake runners during engine operation as is the case with engines that employ carburetors. Instead the combustible mix is present in a runner for only a short interval and in a very limited region of the runner.

In either system, the proportion of oxygen in a given volume of air relative to the other components of the air, such as nitrogen, is relatively fixed. Typically, through proper carburetion or fuel injection, the ratio of oxygen and fuel in the explosive mixture is set to the optimal ratio known to achieve the most efficient explosion. To enhance performance in automotive racing application beyond that possible with conventional fuel systems of the foregoing type, racing enthusiasts learned to inject nitrous oxide ("$N_2O$") into the cylinders along with the combustible mix introduced by the carburetor or fuel injectors and accompany the nitrous injection with an added injection of additional fuel.

Air typically contains about 15% oxygen (by volume) while Nitrous Oxide contains 33% oxygen. When heated to elevated temperatures available within the engine during combustion, the nitrous oxide decomposes into molecules of nitrogen and oxygen gases. Oxygen is thereby released and added to the oxygen in the air introduced through the runner. That additional oxygen enriches the combustible mix in the cylinder. To a limit, the greater the percentage of oxygen in the combustible mixture, the stronger the resultant explosion when the mixture is ignited. Therefore, when nitrous oxide is included as part of the combustible mixture, the power of the explosion is greatly increased, producing increased horsepower from the engine. The additional fuel accompanying the nitrous oxide prevents the combustible mixture from becoming too lean as could cause overheating and damage to the engine. As an advantage, a nitrous oxide system may be used in stock engines without requiring expensive engine modification.

Two principal techniques for introducing the nitrous oxide are currently in use. One is by injection of the nitrous oxide directly into the intake runners of the engine. The other technique is injecting the nitrous oxide into the plenum of the intake manifold.

The first, often referred to as a nitrous nozzle system, employs multiple nozzles, each containing a pair of outlets for individually expressing both nitrous oxide and fuel. Each nozzle is placed directly into a respective one of the intake runners and is connected to nitrous and fuel lines. When the nozzle system is activated during engine operation, nitrous oxide and fuel are introduced into a respective runner by the nozzle associated with that runner. The nitrous oxide is stored in a canister under high pressure and in liquid form. When the nitrous oxide is expressed from the nozzle, the nitrous changes from the liquid state to what is said to be a predominantly gaseous state. The vaporized nitrous oxide essentially impacts at high velocity the fuel simultaneously being expressed. The force of impact atomizes the expressed fuel and the nitrous oxide mixes with that fuel. That mixture merges into the combustible air/fuel mixture being drawn into the intake runner through the carburetor. The nozzle system is considered the optimal technique for delivering nitrous oxide to the engine. A recent nitrous nozzle system, as example, is presented in U.S. Pat. No. 6,520,165, granted Feb. 18, 2003 to Steele, entitled "Nozzle for Emitting Nitrous Oxide and Fuel to Engines".

The second technique is referred to as a nitrous module or, as variously termed, a nitrous plate system. The nitrous plate system employs a generally flat rectangular or square metal plate that contains a central opening or passage through the thickness of the plate that is sized to match the plenum of the intake manifold, and at least one pair of spray conduits that extend across that central passage. The plate is sandwiched between the carburetor and the plenum of the intake manifold of the engine. The spray conduits respectively introduce the nitrous oxide and fuel into the intake manifold plenum. In operation, nitrous oxide and fuel are applied through respective passages in the plate and into the ends of the respective spray conduits, where the respective fluids are expressed through the jets or small spray holes in the side of the conduits into the central opening to merge with the combustible air/fuel mixture being drawn through the carburetor. One nitrous plate system is described in U.S. Pat. No. 5,839,418 to Grant entitled Dual Stage Nitrous Oxide and Fuel Injection Plate, granted Nov. 24, 1998 (the "'418 Grant patent"). A more improved plate system appears in the copending application of Chestnut, the present inventor, and Lowe, Ser. No. 10/039,839, filed Oct. 26, 2001, entitled Nitrous Oxide Plate System for Engines.

Both the nozzle and the plate system include a liquid flow restrictor or calibrator, generally referred to as a jet orifice or, simply, jet to restrict the respective nitrous oxide and fuel flow rates through the respective nozzles and the spray conduits of the plate. Those jets are installed in-line with the respective nitrous oxide and fuel lines, typically inserted in the fitting. The size of the orifice in the respective jets regulates the amount of nitrous oxide and fuel introduced through the spray conduits, and, thereby, regulates the level of horsepower attained from the engine. The jets also regulate the nitrous oxide to fuel ratio of the mixture, which is critical to avoiding engine damage. Jets are commercially available in a variety of hole diameters for use in all types of nitrous oxide systems. Accordingly, the racing enthusiast is able to select different horsepower levels by changing the jets in the manner recommended by the manufacturer.

Because the nozzle system uses individual nozzles for individual engine cylinders, a pair of jets is used for each nozzle, one for the nitrous oxide and the other for the fuel emitted from the nozzle. Using temperature sensors to monitor the temperature of each engine cylinder, one can determine if a cylinder is producing too much horsepower, that is, the exhaust gas is running too hot relative to the other cylinders, and can determine whether the cylinders are providing the same horsepower, that is, the cylinders are running at the same temperature, and, hence, are balanced. If one engine cylinder appears weak relative to the other cylinders, it is possible to change the size of the jets associated with the nozzle for that cylinder, typically the one for the nitrous oxide, to increase the strength of the combustible mix in that cylinder. Conversely, if one cylinder has a combustion strength greater than the others, and, consequently, is running hotter than the other cylinders, it is possible to replace the jets with other jets that have a smaller diameter orifice, which weakens the explosiveness of the mix.

In the foregoing way, the performance of the engine cylinders are individually "tunable" so as to achieve balance between cylinders, intended to produce maximum horsepower while avoiding engine damage. That tunability is an advantage of the nozzle type system. The plate system, however, does not possess that tunability. Although the prior plate system described in the copending application of Chestnut and Lowe, Ser. No. 10/039,839 provides some tunability for pairs of cylinders, the structure is inherently incapable of individually tuning cylinders.

Historically, the nozzle system attained superior results over the nitrous plate system. As a result, the nozzle system achieved wide acceptance among racing enthusiasts. An impediment of a political nature, however, faces racing enthusiasts who use that system. For reasons, which may be partially explained by the effectiveness of the nozzle system, the various racing associations refuse to permit the use of the nozzle system in several classes of drag racing. That prohibition limits many racing enthusiasts to use of the plate system in their automobiles.

The plate system has also been adapted to fuel injected internal combustion engines. A highly regarded fuel injected engine of that type is the Ford 5.0 liter V8 engine, such as those used in the Ford Mustang automobiles for model years 1986 through 1995. The air intake manifold for that engine is a two-piece structure that contains upper and lower intake members, a somewhat unique structure. The two intake members are bolted together in place over the collection of individual air intake runners associated with respective ones of the eight cylinders of the engine. The upper intake member contains the air inlet for drawing in the outside air and the lower intake member contains an air inlet that mates with the respective air outlet of the first member and couples the air inlet to the air outlets to all eight intake runners to the engine.

The Nitrous Oxide Systems company produced a nitrous oxide plate system for the foregoing Ford V8 engine, which appears at page 19 in that company's 2001 catalogue. That plate system includes an elongate metal plate member containing eight ports, one for each of the intake runners, and two pairs of metal spray conduits, one spray conduit in each pair for nitrous oxide and the other in each pair for fuel. One pair of the nitrous oxide and fuel spray conduits extend through each of the four adjacent ports to the right of the plate center in a direction along the longitudinal axis of the plate. The second pair of those spray conduits extend through the remaining four adjacent ports to the left of the plate center also in a direction along the longitudinal axis of the plate. A fitting, which includes a jet, is connected to the input end of each spray conduit to connect the respective conduits to the nitrous oxide and fuel supplies, respectively, carried in the vehicle. For operation, the foregoing plate is sandwiched in between the upper and lower manifold members and those elements are bolted together to the engine.

In operation, the nitrous oxide and fuel are respectively supplied and/or pumped into the respective spray conduits. In turn, the spray conduits emit the respective sprays of nitrous oxide and fuel through small jets or openings in the cylindrical wall of the spray conduit into each of the eight ports providing a nitrous and fuel mix for each. The air being drawn into the engine through the intake manifold (and sandwiched nitrous plate) draws the nitrous fuel mix through the respective runner during the intake cycle for the respective cylinder of the engine producing a nitrous fuel and air mixture. The fuel injector injects the normal measure of fuel into the end of the respective runner near the intake valve of the cylinder at the appropriate interval, where that injected fuel mixes with the mixture of air, nitrous oxide and fuel for collective application in the combustion chamber of the cylinder. Like the plate systems for engines that employ carburetion, the nitrous oxide and fuel introduced by the plate is present in the length of the respective runners.

The foregoing plate system of the Nitrous Oxide Systems company is not without a drawback. Even or balanced distribution of the added nitrous oxide and fuel mixture amongst all of the engine cylinders is a key factor in the use of the plate system. However, the foregoing plate system does not always evenly distribute the nitrous oxide and fuel amongst the individual intake runners of the manifold. Nor does that nitrous plate system posses the desired tuneability. That system contains a jet for each of the nitrous oxide and fuel spray conduits in each of the two pairs of spray conduits, and each pair of those conduits serve a respective four of the eight ports in the plate. Thus, if an individual one of the eight engine cylinders is too weak or too strong, changing the size of the orifice in the jet for the nitrous oxide conduit associated with the weak cylinder, as example, changes the flow rate of the nitrous oxide into the three remaining cylinders serviced by that conduit as well. As a consequence, some of those four cylinders of the engine receive more or less of the powerful nitrous fuel mix than the others, producing an unbalance in the combustion power. That imbalance not only detracts from engine performance, but could potentially be harmful to the internal components of the engine. Tinkering with the fuel injection to adjust the fuel injected in one or more cylinders could aid in adjusting balance between the cylinders, but that procedure is not recommended as changing the injector mapping in the electronic control module is very costly and, when the engine is not running with the nitrous oxide, the fuel delivery to the engine cylinders is uneven. As an advantage the present plate system is tunable.

Further, since each of the two pairs of spray conduits of the foregoing nitrous plate system respectively spans the length of four of the eight ports in the plate, when the respective solenoid valves in the automobile open to permit the nitrous oxide and fuel to enter one end of the respective spray conduits, those liquids flow into and toward the opposite end of the respective conduit. Although the nitrous oxide is under a very high pressure, some very small but finite interval of time is required for the initial flow to reach the end of the spray conduit and permit the respective spray conduits to express nitrous oxide evenly from the spray holes positioned over each of the four ports. Inherently, the ports at the inlet end of the spray conduit receive the nitrous (and fuel) spray first and the fourth port in the group of four ports receives the nitrous (and fuel) spray last. That results in an unavoidable lag in developing the horsepower available from the engine.

The consequence of the initial flow of nitrous oxide into the spray conduit has been thought to be a possible source of some of the distribution problem experienced by users. Some have speculated that liquid nitrous oxide under high pressure is capable of vaporizing from the liquid state in the short time that is taken for the initial flow to span the distance from one end of the spray conduit to the other. Thus, those spray holes lying over the fourth port may be spraying a gas, while the ports closest to the first port will be vaporizing the nitrous oxide at the spray hole. This is believed to create some imbalance in the volume of nitrous oxide expressed, at least initially, until the fluid stabilizes.

Therefore, a principal object of the invention is to improve the distribution of nitrous oxide and fuel in nitrous plate systems for fuel injected internal combustion engines and increase available horsepower in those engines.

A further object of the invention is to reduce start up lag in a nitrous plate system for a fuel injected engine and thereby enhance acceleration of the engine.

A still further object of the invention is to provide a nitrous plate system for a fuel injected engine that permits tuning of the individual cylinders of the engine.

And a more specific object of the invention is to provide a nitrous plate system that enhances the horsepower available from a Ford 5.0 liter V8 engine without requiring modification of the engine.

ABSTRACT OF THE DISCLOSURE

In accordance with the foregoing objects and advantages, a tunable nitrous plate assembly for a fuel injected Ford 5.0 liter V8 engine in accordance with the invention includes a metal plate that is adapted to be sandwiched between the upper and lower manifold members of the air intake manifold for the engine. The plate contains multiple ports that mate with the ports found in the lower manifold member. Each of those ports includes a nitrous oxide spray conduit overlying a fuel spray conduit, both supported by the plate, and both spray conduits extend across the port transverse the longitudinal axis of the plate. The conduits contain an open end that opens into a respective passage through a side of the plate to the exterior. A fitting attaches to the outside of the metal plate and communicates through one of the passages with the open end of the nitrous oxide spray conduit to provide a path for the flow of nitrous oxide into the respective spray conduit. Another fitting attaches to the outside of the metal plate and communicates through the other passage with the open end of the fuel spray conduit to provide a path for the flow of fuel into the respective spray conduit.

Further, in accordance with an aspect of the invention, each fitting houses a jet and is adapted to couple to a respective nitrous oxide or fuel supply line. The jets are replaceable to permit the user to individually select a size for each port so that the horsepower developed by each engine cylinder during operation is essentially the same, that is, tune the nitrous plate system and balance cylinder performance.

In accordance with a more specific aspect of the invention, the spray conduits each contain two spaced parallel rows of spray holes extending parallel to the spray conduit axis with an equal number of holes in each. The spray holes in one spray conduit are axially aligned with those in the other spray conduit. The rows of spray holes in the spray conduit for the fuel are spaced one-hundred and eighty degrees apart about the conduit axis. The rows of spray holes in the overlying spray conduit for the nitrous oxide are spaced apart about sixty degrees about the conduit axis. The two conduits are angularly oriented so that the rows of spray holes in the two conduits are angularly symmetric and the spray holes in the spray conduit for the nitrous oxide facing downwardly at an angle into the port.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

BRIEF DESCRIPTION OF THE DRAWINGS

FIG. 3 illustrates a section of the embodiment taken along the lines 3—3 in FIG. 1;

FIG. 4 is a top view of the plate used in the embodiment of FIG. 1;

FIG. 5 is a section of the plate taken along the lines 5—5 in FIG. 4;

FIG. 6 is another section of the plate taken along the lines 6—6 in FIG. 4;

FIG. 7 is a side view of the plate of FIG. 4 viewed from the bottom edge in FIG. 4;

FIG. 8 is an enlarged perspective of the spray conduits and FIG. 9 is an enlarged section view of the pair of spray conduits;

FIG. 10 pictorially illustrates the position of the plate of FIG. 1 with respect to the two portions of the intake manifold for the Ford 5.0 liter V8 engine; and FIG. 11 is a schematic of the nitrous system that incorporates the embodiment of FIG. 1 as installed for operation in a vehicle.

DETAILED DESCRIPTION OF THE PREFERRED EMBODIMENT

Figure 1:
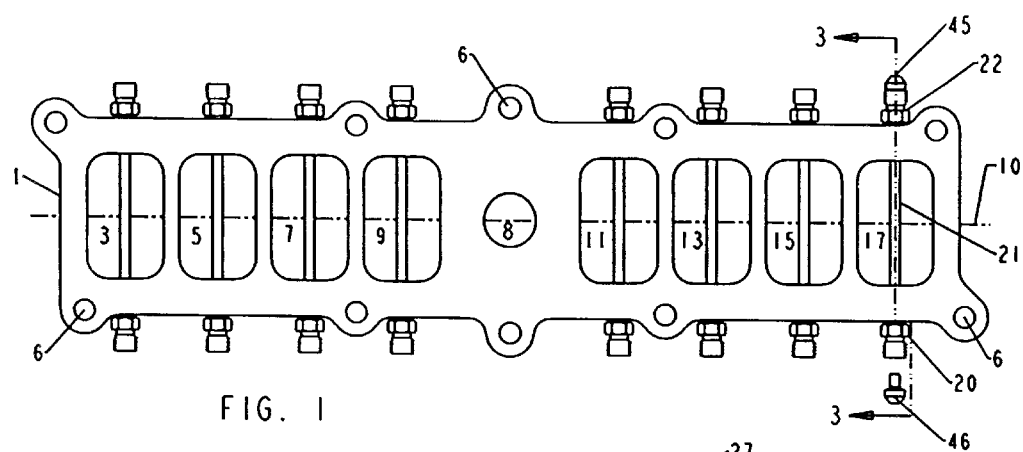
FIG. 1 shows an embodiment of the invention in top view.

Reference is made to FIG. 1 illustrating a preferred embodiment of the plate assembly for an eight cylinder fuel injected engine in a top view. A significant portion of that assembly is a plate 1. The plate is elongate, that is, is greater in length than width, is of a short thickness (or height), flat, rigid, and formed of metal, such as aluminum. A series of eight passages or ports 3, 5, 7, 9, 11, 13, 15 and 17 are spaced along the longitudinal axis 10. Those ports each extend through the thickness of the plate, perpendicular to the upper plate surface 2 and to the lower plate surface 4, not visible in this view. As shown, the ports are generally rectangular in shape, containing rounded corners and are substantially identical in appearance, area and shape. Four of those ports are located to the left of a central circular passage 8, the exhaust gas return ("EGR") hole for return of exhaust gas containing unburned fuel, and the remaining four ports are located to the right of that passage, with the ports being symmetrically positioned about EGR hole 8. Each port is symmetrically positioned about the longitudinal axis 10 with the longest side wall of the port extending along the width dimension of the plate. A series of bolt holes 6 extends through the plate.

Considering one of the ports, port 17, a pair of hollow cylindrical spray conduits 21 and 23, only one of which is visible in this view, are mounted inside the port spaced from the upper and lower plate surfaces with the axis of those conduits extending transverse longitudinal axis 10 of plate 1 and bisecting the respective port. Those spray conduits are formed of a hollow cylindrical metal tube, suitably brass, and contains minute spray holes in the cylindrical wall, later herein more fully described. Spray conduit 23 underlies spray conduit 21, as better viewed in the perspective of FIG. 2. Referring again to FIG. 1, a threaded fitting 20, associated with spray conduit 21, is fastened to the foreground side of the plate and a second threaded fitting 22, associated with spray conduit 23, is fastened to the distant side of the plate in the figure. Each of the remaining ports mounts in the identical manner as port 17 a like pair of hollow spray conduits, and associated threaded fittings. Since those spray conduits and threaded fittings all serve the same function as the spray conduits in port 17, they may be referred to for convenience by the same designations used for those in port 17 and need not be separately described in detail.

The fuel injected engine that employs the invention contains an air intake manifold to supply air, containing the oxygen, from the exterior of the automobile to the individual cylinders of the engine. Conveniently, the intake manifold is formed in two parts, which may be separated. The two members of the air intake manifold are, for one, bolted together on the engine through threaded bolt holes in the lower intake member. Further, the lower intake member contains eight air input ports leading, respectively, to eight air runners, one for each cylinder in the eight cylinder engine. Those runners in turn lead to respective cylinders of the engine.

During engine operation, the air in a runner is basically stagnant when the intake valve of the engine cylinder with which the respective runner is associated is closed, although some turbulence in that air may be caused by the external air introduced into the intake manifold. When the intake valve opens, however, the velocity of the air presented to the plenum of the intake manifold and the vacuum created in the cylinder forces or draws air into the cylinder. Air received in the upper intake member is thereby drawn into the eight intake ports in the lower intake member, and, hence, into the respective runners in a serial order as each engine cylinder in turn opens an associated intake valve. Plate 1, much like an adapter or gasket, is designed to fit inbetween the two intake manifold members with those three elements being attached in a sandwiched relationship. To accomplish that relationship, the upper intake manifold member is unbolted from the lower member, plate 1 is placed over the lower plate member and properly aligned, with the bolt holes and ports aligned with the corresponding holes and ports of the lower manifold member with the axis of the spray holes in the nitrous spray conduits facing in a downward direction toward the lower manifolds, and the upper manifold member is replaced and re-bolted, using threaded bolts of greater length if necessary, to sandwiching plate 1 there between. Because the silhouette of plate 1 is shallow, the added height of the sandwiched assembly does not create interference with the hood of the automobile.

As those skilled in the art appreciate, the size and shape of plate 1, the area, shape and position of the ports, and the bolt holes is generally governed to match the size and shape of the lower and upper intake members of the two-piece air input manifold of the engine. That permits air from the exterior to be sucked through the upper intake manifold member and pass through the respective ports, in the direction from the top side 2 of plate 1 to the bottom side 4, and thence through the respective runners, not illustrated, to the engine cylinders during the respective intake cycle thereof with little or no obstruction created by plate 1.

Figure 2:
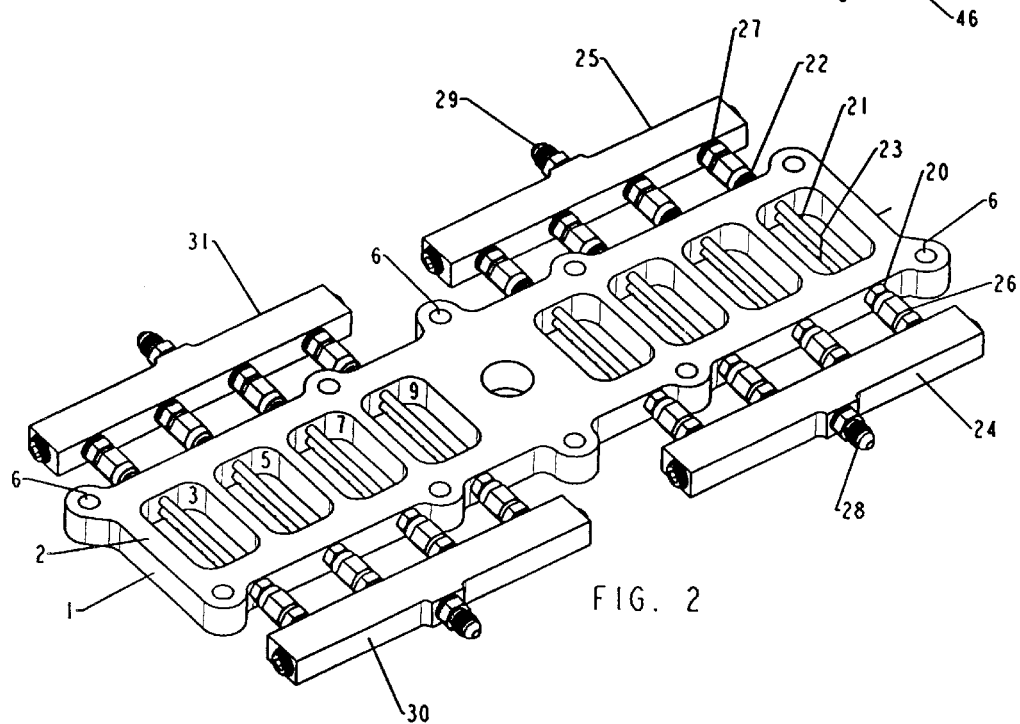
FIG. 2 is a perspective view of the embodiment of FIG. 1 combined with a fuel and nitrous oxide distribution apparatus.

Reference is again made to the perspective of FIG. 2, which illustrates the plate of FIG. 1 combined with the elements of a nitrous oxide and fuel distribution plumbing used therewith to respectively distribute the nitrous oxide and fuel to the respective sprayers in all of the ports. For convenience the numbers used to designate elements of plate 1 are used to designate those same elements in this figure. The fittings 20 for the nitrous oxide, associated with ports 11, 13, 15 and 17, are coupled to a distribution bar 24 by respective ones of the threaded couplings 26, later discussed more fully. A threaded input coupling 28 to distribution bar 24 provides a connection to the conduit to the nitrous supply, not illustrated, that is carried in the vehicle. Internally, the distribution bar contains a hollow region that permits liquid nitrous oxide that is pumped into the distribution bar through connector 28 to flow to the four threaded couplings 26, couplings 20 and, thence, into the associated nitrous oxide spray conduits 21 in the ports. A like nitrous oxide distribution bar 30 and associated jet couplings, which need not be separately numbered, is included for the four fittings associated with ports 3, 5, 7 and 9.

An identical distribution bar 25 on the opposite side of plate 1 is included to handle distribution of the liquid fuel, such as gasolene or alcohol. Distribution bar 25 also includes four threaded couplings 27 and a threaded input coupling 29, which couples to a fuel line to the fuel pump of the automobile, not illustrated, but schematically illustrated in FIG. 11, later herein described. Fuel pumped into the distribution bar 25 via coupling 29 is distributed through the internal cavity in the distribution bar to the four fittings 22 associated with the fuel spray bars 23 in ports 11, 13, 15 and 17. An identical fuel distribution bar 31 and associated threaded couplings and threaded input coupling shown to the left is also provided on the rear side of plate 1. That distribution bar is associated with ports 3, 5, 7 and 9.

Reference is made to FIG. 3, which is an enlarged partial section of the plate assembly of FIG. 1 taken along the lines 3—3, but in which jets have been included in the fittings. Both spray conduits 21 and 23 span the distance across port 17 and respectively extend into passages (and pockets) in opposing front and rear side walls of the port. Spray conduit 23 for the fuel contains spaced spray passages or spray holes 18, only one of which is numbered. Likewise, spray conduit 21 for the nitrous oxide, mounted in plate 1 above conduit 23, contains spaced spray passages or spray holes 19, only one of which is numbered. The holes in the two conduits are spaced apart longitudinally the same extent and the holes 19 in one conduit are aligned longitudinally with a corresponding hole 18 in the second conduit. The inlet end of conduit 23 couples into the passage in fitting 20 mounted on the right in the figure and the opposite end of the tube is blocked or closed by the walls of the pocket formed in the rear port wall.

The inlet end of spray conduit 21 couples into the passage in fitting 22 mounted on the left in the figure and the opposite end of the tube is blocked or closed by the walls of the pocket formed in the front port wall. The axes of the spray conduits (and the spray conduits) are oriented in parallel with the ends seated and sealed in openings in the port walls, later herein described in connection with FIG. 6. The closed ends of both spray conduits is also sealed closed and firmly bonded to the walls by bonding material 39, suitably epoxy, that is applied between the exterior of those conduits and the respective walls of the port.

Continuing with FIG. 3, fitting 22 threads into place within the threaded opening in the side of the plate associated with a respective one of the eight ports, such as threaded passage 33 shown in FIG. 4, next discussed. That fitting contains a threaded portion 43 for threaded engagement with an appropriate nitrous oxide or fuel line, such as the coupling 27 of the fuel distribution bar 25, earlier illustrated in FIG. 2, an axially extending central passage 41 through fluid can pass to the input end of the spray bar in plate. In practice fitting 22 also serves a jet holder. A like fitting 20 is threaded into a threaded opening, such as 32 illustrated in FIG. 4, located in an opposite exterior wall of the plate adjacent the respective port 17, and another jet 46 of appropriate size (illustrated in exploded view) is seating inside that fitting.

A jet 45 is installed in the front end of the fitting. That jet is held in place by the fitting of the associated coupling of the respective nitrous or fuel line, not illustrated. The jet 45 is inserted into the holder placing the jet orifice in series fluid relationship, that is, in-line, in the respective nitrous or fuel conduit. The foregoing jets with appropriate orifices are inserted into each fitting for the respective nitrous and the fuel inlet of each port.

The orifice of the respective jets regulates the amount of nitrous oxide and/or fuel that is introduced into a port, and, thereby, ultimately regulates the level of horsepower attained from the engine. The jets also regulates the nitrous oxide to fuel ratio of the mixture, which is critical to avoiding engine damage. Jets, such as jets 45 and 46, are commercially available in a variety of hole diameters for use in nitrous oxide systems. Accordingly, the user is able to select different horsepower levels by changing the jets in the manner recommended by the manufacturer.

Reference is next made to FIG. 4 showing a top view of the plate 1 of FIG. 1 with the spray conduits 21 and 23 and fittings 20 and 22 removed. As illustrated in phantom lines, the plate includes a threaded passage 32 (for the nitrous oxide) through the front side wall 12 of plate 1. That passage extends into a smaller diameter passage portion 34 through the front side wall of port 17. The plate also contains a threaded passage 33 (for the fuel) in the rear side wall 14 of the plate directly opposite to threaded passage 32. Passage 33 extends into a passage 35, smaller in diameter than passage 33, that extends through the rear side wall of port 17. Passage 35 is the same diameter as passage 34. Threaded passages 32 and 33 permit the respective fittings (and jet holders) to be threaded into place in the plate.

Threaded passages 32 and 33 are positioned at different heights relative to the base or bottom surface 4 of plate 1. The relationship between the passages and additional detail is better illustrated in FIG. 6, which is a section taken along the lines 6—6 in FIG. 4. The rear wall of port 17 contains a cylindrical socket or pocket 36 of short depth that is aligned coaxial with passage 34 in the opposite wall and is of the same diameter as that passage. That pocket is located directly above passage 35. Likewise, the front wall of port 17 includes another cylindrical socket or pocket 37 of short depth, located directly below cylindrical passage 34. Pocket 37 is aligned coaxial with passage 35 in the opposite wall and is the same diameter as the latter passage. As one appreciates, passage 34 and pocket 36 form the mount for the nitrous oxide spray conduit 21; and passage 35 and 37 form the mount for the fuel spray conduit 23. Returning to FIG. 3, nitrous spray conduit 21 spans the port between the respective passage 34 and pocket 36; and fuel spray conduit 23 likewise mounts between the passage 35 and pocket 37 spanning the port In fabricating the plate assembly, each spray conduit is carefully inserted through a side wall of the plate and the end of that conduit is pulled or pushed across the port and inserted into the associated pocket. Then epoxy, not illustrated in the figure, is used to bond and seal the periphery at each end of the spray conduits to the port walls.

The foregoing passages 34 and 36 and 35 and 37 are formed by using a fairly long drill bit and drilling through one side of plate 1. Then drilling through the front side wall of the port for the passage 34 (or the rear side in connection with the other aligned passage 35 and associated pocket), extending the drill bit across the port and drilling a short distance into the rear side wall of the port. Once the smaller size passages are drilled, then a larger diameter bit is used to enlarge the hole to the size required by the fitting. The larger hole is then threaded to the pitch required by the fittings.

The foregoing structure was described for port 17, which is representative of the corresponding structure in all of the other ports in the plate. Since that additional structure in the remaining ports is identical to that described in the preceding paragraphs, it is not necessary to repeat the description or to identify those elements by number. Returning briefly to FIG. 4, as shown, the threaded passages into ports 3, 5, 7, 9, 11, 13, and 15, corresponding to passage 32 in port 17, are identical in structure, the center line of those cylindrical passages are coplanar and are centered more close to upper surface 2 than lower surface 4 of the plate, such as shown in the rear side view of the plate illustrated in FIG. 7.

Referring to FIG. 5, which is a section taken along the line 5—5 in FIG. 4, cylindrical passage 35 is positioned vertically below cylindrical pocket 36 and the axis of those two cylindrical elements are in parallel to one another and normal to the rear wall of port 17. A vertical plane through the axis of those two elements bisects the port. Thus, the spray conduits, when installed, are centrally located in the port and the axes of those spray conduits bisect the port in the longitudinal direction, between the left side wall and right side wall of the port.

FIGS. 8 and 9, to which reference is made, illustrates spray conduits 21 and 23 in perspective and in section, respectively, in a larger scale than previous figures. As earlier described, the nitrous and fuel spray conduits 21 and 23 are organized in pairs, one pair located in each port. Spray conduit, 21, the uppermost in a given pair, more close to the upper surface of plate 1, is for expressing nitrous oxide. The other spray conduit in the pair, conduit 23, the lowermost one, nearest the bottom surface of the plate, is for expressing fuel. Nitrous spray conduit 21 contains six evenly spaced spray holes 19 on the side arranged in a row, and a like number of spray holes arranged in a row on the opposite side, for a total of twelve spray holes. Those holes are symmetrically positioned in the spray conduit about the spray conduit axis and are evenly spaced between the walls of the respective port.

Fuel spray conduit 23 also contains two like rows of spray holes 18, six of which are visible in the figure; and the remaining six spray holes are obstructed from view by the conduit walls. The rows of spray holes 18 are also symmetrically located about the conduit axis with the holes in the rows being evenly spaced. Moreover each pair of spray holes in spray conduit 23 is longitudinally aligned along the axis of the respective conduit with a corresponding pair of spray holes in spray conduit 21. Although two rows of six spray holes is preferred, as one appreciates a different number of holes may be selected if found desirable.

As better illustrated in the section view of FIG. 9, spray holes 19 in nitrous spray conduit 21, as mounted in plate 1, are angularly spaced from the vertical 40, normal to plate 1, by about thirty degrees, measured clockwise from the vertical for one row of holes and measured counterclockwise for the other row. That conduit is angularly oriented in plate 1 so that the two rows of holes 19, as example, are symmetrically positioned relative to the corresponding holes 18 in spray conduit 23 and face in a generally downwardly direction toward the bottom side 4 of plate 1. Each of the rows of spray holes 18 in spray conduit 23 are angularly spaced from the vertical 40 by ninety degrees, measured clockwise for one row and counterclockwise for the other. Those side holes on the left are angularly spaced from the side holes on the right by one-hundred and eighty degrees about the axis of the conduit with each pair of holes essentially located along a diameter of the cylindrical spray conduit. As installed in the respective port of plate 1, the axis of the spray holes 18 is directed toward the left and right side walls of the respective port. Essentially the spray holes in both spray conduits are arranged symmetrically relative to a vertical plane normal to plate 1 that extends through the axis of each spray conduit of the pair.

In operation the stream of nitrous oxide expressed from spray holes 19 collides with the mist of fuel expressed from spray holes 18 and breaks the fuel into smaller particles, aiding in fuel atomization, and both fuel and nitrous oxide are drawn into the runner associated with the respective port when the respective engine cylinder associated with that runner is in the intake portion of the engine cycle.

As illustrated pictorially in FIG. 10, plate 1 is sandwiched between the upper intake member 46 and the lower intake member 48 and held together by bolts 49; and the assembly is bolted to an upper surface of the engine 50 overlying the intake runners of the engine. Once the plate is installed, the fittings, jets, distribution channels are assembled to the plate. The plate system is installed in the vehicle along with the conventional control and supply circuits, such as is schematically illustrated in FIG. 11 to which reference is made.

The nitrous plate assembly, including associated fittings, and the distribution bars are schematically represented in the dash-line box 51 in the figure. The fuel line 51 coming from the fuel pump of the vehicle is fanned out into two lines, 52 and 53, which are individually coupled respectively to the two fuel distribution bars 31 and 25. Electrically operated solenoid valves control those lines, as represented by the electromagnet coils 54A and 55A and normally open valve gate 54B and 55B in series with the fuel lines controlled by the respective coils. Likewise a nitrous oxide line 56, extending from a storage canister, not illustrated, containing the nitrous oxide, also fans out into two separate lines, 57 and 58,which are individually coupled to respective ones of the two nitrous oxide distribution bars 30 and 24. Electrically operated solenoid valves control those two lines, as represented by coils, 59A and 60A, and the normally open valve gates 59B and 60B in series with the respective nitrous oxide lines. An electrical conductor leading to the +12V vehicle battery through fuse 61 and relay contact 62B, when closed, supplies electrical power to the solenoids only when the series connected normally open relay contact 62B is closed.

Relay 62A is wired between the switched twelve volt supply, such as to the ignition switch, originating from the vehicle battery potential, and ground potential in series with switches, 63 and 64. Switch 63, referred to as the arming switch, is a manually operated single pole single throw switch connected on the high voltage side of the relay coil 62A. A lamp 65 associated with switch 63 is connected between the movable contact of the switch and electrical ground. When switch 63 is manually closed by the person, a circuit from the 12 volt source is completed through lamp 65 to ground and current flows through the lamp, which illuminates. That illumination visually indicates to the person that the nitrous system is armed and ready to operate.

Switch 64 is a single throw single throw normally open microswitch, referred to as the throttle switch, which is spring biased to the open condition. The throttle switch is installed in the vehicle adjacent to the throttle (e.g. the gas pedal) and is adjusted so that the switch operates only when the gas pedal is fully depressed (e.g. the throttle is fully open). One terminal of switch 64 is connected in series between the second terminal of relay coil 62A to electrical ground. With switch 63 is closed, the nitrous system beings operation when the person fully depresses the gas pedal actuating switch 64, as occurs at the start of a drag race. Relay 62A closes contact 62B, which connects the battery to each of the solenoids 54A, 55A, 59A and 60A, and current flows through each solenoid. The solenoids operate and open the valves in the gas and nitrous oxide lines, releasing the pressurized fluids to flow into plate system 51, whereupon the pressurized nitrous oxide and fuel are thus sprayed into the respective intake runners along with the air being drawn in from the exterior. Those ingredients add to the fuel injected into the end of the runner by the fuel injector for the respective cylinder creating a powerful explosive mix.

In a practical embodiment of the invention, plate 1 is of solid aluminum with a black anodized finish about fourteen inches long by about 3 inches wide and 0.536 inches thick, and was surfaced reasonably flat on upper and lower surfaces. Passages 34 and 35 and pockets 36 and 37 are of a diameter of 0.157 inches. The center to center spacing of passage 34 and pocket 37 and also between passage 35 and pocket 36 was typically 0.225 inch. The larger diameter threaded passages 32 and 33 were of a depth of 0.325 inch and was threaded with a ¼-28 thread. The depth of pockets 36 and 37 was 0.130 of an inch. The spacing between the two spray conduits was quite small, about 0.058 of an inch. The spray conduits were of 5/32 inch brass tube with an outer diameter of 0.156 inch. The spray conduit for the nitrous oxide contained holes that were 0.024 inch in diameter, arranged longitudinally spaced in pairs. Four longitudinally spaced holes were sufficient to extend across the width of the port. The spray conduit for the fuel contained a like number of spray holes of a diameter of 0.026 inch and were longitudinally arranged in pairs extending across the port aligned with the corresponding spray holes in the nitrous oxide conduit.

The invention significantly increases the horsepower generated by the fuel injected Ford 302 V8 engine. The plate system permits tuning of the individual cylinders so that the power generated by each cylinder is balanced, increasing the reliability and longevity of the engine. More horsepower can be generated with reliable engine wear, since no one cylinder or valve will heat excessively and burn-up.

As one appreciates, in an alternative embodiment it would be possible to arrange the fittings and passages for both nitrous oxide and fuel in the plate assembly to respectively be mounted in the same outer wall and extend to the same outer wall of the plate assembly. However because of the size of the fittings that would required the plate to be greater in thickness to accommodate both, detracting from the slim profile in the preferred embodiment. That modification in turn would raise the height of the upper portion of the air intake assembly and result in a greater likelihood of mechanically interference with the hood of the vehicle, when the hood is lowered. For that reason that alternative is not preferred.

In the preferred embodiment, all of the nitrous oxide fittings for the eight ports and the inlets of the associated nitrous spray conduits for those ports are positioned on the same side of the plate, while all of the fuel fittings for those ports and the inlets of the associated fuel spray conduits are positioned on the same opposed side of the plate. As one appreciates, in an alternative embodiment it is possible to position some of the nitrous oxide fittings and associated nitrous spray conduit inlets in opposite front and rear sides of the plate (and likewise alternate the position of the fuel fittings and fuel spray conduit inlets). Such an arrangement would complicate the routing of the fuel and nitrous supply lines, and, because of the similarity of the fittings, would be more prone to confuse the installer of the nitrous system and create mistakes in hooking up the respective supply lines. Obviously, such an alternative is less preferred.

It is believed that the foregoing description of the preferred embodiments of the invention is sufficient in detail to enable one skilled in the art to make and use the invention without undue experimentation. However, it is expressly understood that the details of the elements comprising those embodiments that were presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed with the full scope of the appended claims.

What is claimed is:

1. A nitrous oxide plate assembly for a fuel injected internal combustion engine, comprising:

an elongate metal plate of predetermined thickness;
said elongate metal plate containing a plurality of ports there through, said ports being spaced apart along a longitudinal axis of said elongate metal plate, with said plurality being equal in number to the number of cylinders in said internal combustion engine;
each of said ports including:
front, rear, left and right side walls; and
first and second spray conduits, each of said spray conduits being of a straight tubular geometry;
said first spray conduit overlying said second spray conduit and being in parallel therewith;
said first spray conduit including two spaced parallel rows of spray holes for expressing nitrous oxide, each of said rows of spray holes extending parallel to the axis of said first spray conduit and including a like number of spray holes;
said first spray conduit extending across said port transverse said longitudinal axis of said elongate metal plate and having a first end seated in a first pocket and a second end seated in a first passage, said first pocket being located in one of said front and rear walls and said first passage being located in the other one of said front and rear walls;
said second spray conduit including two spaced parallel rows of spray holes for expressing fuel, each of said rows of spray holes extending parallel to the axis of said second spray conduit and including a like number of spray holes;
and wherein said number of spray holes in each row of spray holes in said second spray conduit is equal to said number of spray holes in each row of spray holes in said first spray conduit;
said second spray conduit extending across said port transverse said longitudinal axis of said elongate metal plate and having a first end seated in a second pocket and a second end seated in a second passage, said second pocket being located in one of said front and rear walls and said second passage being located in the other one of said front and rear walls;
each of said first and second passages extending through to an outer side wall of said elongate metal plate to provide respective fluid paths from the exterior of said plate into said first and second spray conduits, respectively; and
first and second fittings coupled, respectively, to said first and second passages for coupling nitrous oxide and fuel, respectively to said first and second passages.

2. The nitrous oxide plate assembly for a fuel injected internal combustion engine as defined in claim 1, wherein said one of said front and rear walls that contains said first pocket comprises said front wall, wherein said first passage is located in said rear wall, and wherein said first fitting couples to said first passage from an outer rear side wall of said plate, and wherein said one of said front and rear walls that contains said second pocket comprises said rear wall, wherein said second passage is located in said front wall of said port, and wherein said second fitting couples to said second passage from an outer front side wall of said plate.

3. The nitrous oxide plate assembly for a fuel injected internal combustion engine as defined in claim 1, wherein each of said first and second fittings includes a jet.

4. The nitrous oxide plate assembly for a fuel injected internal combustion engine as defined in claim 1, wherein each of said first and second spray conduits bisect said port in a direction perpendicular to said longitudinal axis of said plate.

5. The nitrous oxide plate assembly for a fuel injected internal combustion engine as defined in claim 1, wherein each of said first and second tubular spray conduits are of the same diameter.

6. The nitrous oxide plate assembly for a fuel injected internal combustion engine as defined in claim 1, wherein said first and second spray conduits contain an equal number of spray holes, and wherein said spray holes of said first spray conduit overlie corresponding ones of said spray holes of said second spray conduit.

7. The nitrous oxide plate assembly for a fuel injected internal combustion engine defined in claim 6, wherein said two rows of spray holes in said first spray conduit are angularly spaced apart about the axis of the first spray conduit by sixty degrees, and wherein said first spray conduit is angularly oriented in said port with an axis of symmetry extending between said two rows of spray holes oriented normal to the upper surface of said plate; and wherein said two rows of spray holes in said second spray conduit are angularly spaced apart about the axis of the second spray conduit by one-hundred and eighty degrees and wherein said second spray conduit is angularly oriented in said port with an axis of symmetry extending between said two rows of spray holes oriented normal to the upper surface of said plate.

8. The nitrous oxide plate assembly for a fuel injected internal combustion engine as defined in claim 1, wherein spray holes of said first spray conduit are of a first predetermined diameter and said spray holes of said second spray conduit are of a second predetermined diameter different from said first diameter.

9. The nitrous oxide plate assembly for a fuel injected internal combustion engine as defined in claim 1, wherein said first and second spray conduits are located mid-way between said right and left side walls of said port.

10. The nitrous oxide plate assembly for a fuel injected internal combustion engine as defined in claim 1, wherein each of said first and second pockets includes epoxy for attaching an end of said respective nitrous oxide and fuel spray conduits to the plate in a leak-proof relationship; wherein said first and second passages include epoxy for attaching an end of said respective nitrous oxide and fuel spray conduits to the plate in a leak-proof relationship; wherein said first and second passages each contain a threaded portion and wherein said first and second fittings each include a threaded portion for threaded engagement, respectively, with said first and second passages.

11. A nitrous plate system for a fuel-injected eight cylinder internal combustion engine, said engine including an air intake manifold, and said air intake manifold including a lower manifold member and a upper manifold member, separable from said lower manifold member, comprising:

an elongate flat metal plate, said plate being adapted to fit between said upper and lower manifold members of said air intake manifold, said plate having a predetermined thickness, first and second sides, upper and lower planar surfaces, and a longitudinal axis and;

said plate further including a plurality of ports defining a plurality of passages through said upper and lower surfaces and said thickness of said plate for respectively channeling of air drawn in through said upper manifold member amongst a like plurality of outlet ports in said lower manifold member, each of said ports including first and second walls, and said plurality of ports being equal in number to the number of cylinders in said multi-cylinder engine;

said plurality of ports being spaced apart and arranged in-line along said longitudinal axis of said plate and said ports being of substantially identical size and shape;

each said port in said plate including first and second spray conduits;

said first spray conduit, comprising a first hollow cylindrical metal tube, said first hollow cylindrical metal tube including an open end and first and second rows of spray holes;

said first and second rows of spray holes of said first hollow cylindrical metal tube being angularly spaced by a first predetermined number of degrees in angle, each of said rows of spray holes therein comprising a first plurality of spray holes and wherein said first plurality of holes are longitudinally spaced a predetermined distance apart;

said second spray conduit, comprising a second hollow cylindrical metal tube, said second hollow cylindrical metal tube including an open end and first and second rows of spray holes;

said first and second rows of spray holes of said second hollow cylindrical metal tube being angularly spaced by a second predetermined number of degrees in angle, each of said rows of spray holes therein comprising a plurality of spray holes equal in number to said first plurality of spray holes and wherein said plurality of holes in a row are longitudinally spaced said predetermined distance apart;

said first hollow cylindrical metal tube being positioned vertically overlying said second hollow cylindrical metal tube and positioned at a midposition of said port;

said first and second hollow cylindrical metal tubes extending in parallel across said port perpendicular to said longitudinal axis of said plate and spanning the distance between the first and second walls of said port;

each said port including first and second passages associated therewith, said first passage extending from said first side of said plate through a first wall of said port and said second passages extending said second side of said plate and through a second wall of said port, opposite to said first wall;

said first passage being located at a first predetermined distance above said lower surface of said plate and including a threaded portion;

said second passage being located at a second predetermined distance above said lower surface of said plate and including a threaded portion;

a first cylindrical pocket for receiving an end of one of said first and second hollow cylindrical metal tubes; said first cylindrical pocket being located in said second wall of said port at a position coaxially aligned with said first passage and at said first predetermined distance above said lower surface of said plate and extending into said plate a predetermined distance;

a second cylindrical pocket for receiving an end of the other one of said first and second hollow cylindrical metal tubes; said second cylindrical pocket being located in said first wall of said port at a position coaxially aligned with said second passage and at said first predetermined distance above said lower surface of said plate and extending into said plate a predetermined distance;

said open end of said first hollow cylindrical metal tube being received in said first passage and the opposed end of said first hollow cylindrical metal tube being received in said first pocket;

said open end of said second hollow cylindrical metal tube being received in said second passage and the opposed end of said second hollow cylindrical metal tube being received in said second pocket;

said first hollow cylindrical metal tube being angularly positioned with said first and second rows of spray openings being symmetrically positioned relative to a vertical axis through the center of said port;

said second hollow cylindrical metal tube being angularly positioned with said first and second rows of spray openings symmetrically positioned relative to said vertical axis through the center of said port;

a first fitting, said first fitting having a threaded portion for threaded engagement with said first passage for coupling a source of nitrous oxide to said first passage; and a second fitting, said second fitting having a threaded portion for threaded engagement with said second passage for coupling a source of fuel to said second passage.

12. The nitrous plate system for a fuel-injected eight cylinder internal combustion engine as defined in claim 11, further comprising:

a first jet, said first jet being received within said first fitting for proving a a passage of a first predetermined diameter through which nitrous oxide from said source of nitrous oxide must pass through to reach said first passage in said plate; and a second jet, said second jet being received within said second fitting for providing a passage of a second predetermined diameter through which fuel from said source must pass through to reach said second passage in said plate.

13. A nitrous plate system for a fuel-injected eight cylinder internal combustion engine, said engine including an air intake manifold, and said air intake manifold including a lower manifold member and a upper manifold member, separable from said lower manifold member, comprising:

an elongate flat metal plate, said plate being adapted to fit between said upper and lower manifold members of said air intake manifold, said plate having a predetermined thickness, first and second sides, upper and lower planar surfaces, and a longitudinal axis and;

said plate further including a plurality of ports defining a plurality of passages through said upper and lower surfaces and said thickness of said plate for respectively channeling of air drawn in through said upper manifold member amongst a like plurality of outlet ports in said lower manifold member, each of said ports including first and second walls, and said plurality of ports being equal in number to the number of cylinders in said multi-cylinder engine;

said plurality of ports being spaced apart and arranged in-line along said longitudinal axis of said plate and said ports being of substantially identical size and shape;

each said port in said plate including first and second spray conduits;

said first spray conduit, comprising a first hollow cylindrical metal tube, said first hollow cylindrical metal tube including an open end and first and second rows of spray holes;

said first and second rows of spray holes of said first hollow cylindrical metal tube being angularly spaced by sixty degrees, each of said rows of spray holes therein comprising a first plurality of spray holes and wherein said first plurality of holes are longitudinally spaced a predetermined distance apart;

said second spray conduit, comprising a second hollow cylindrical metal tube, said second hollow cylindrical metal tube including an open end and first and second rows of spray holes;

said first and second rows of spray holes of said second hollow cylindrical metal tube being angularly spaced by one-hundred and eighty degrees and each of said rows of spray holes therein comprising a plurality of spray holes equal in number to said first plurality of spray holes and wherein said plurality of holes in a row are longitudinally spaced said predetermined distance apart;

said first hollow cylindrical metal tube being positioned vertically overlying said second hollow cylindrical metal tube and being positioned at a mid-position of said port;

said first and second hollow cylindrical metal tubes extending in parallel across said port perpendicular to said longitudinal axis of said plate and spanning the distance between the first and second walls of said port;

each said port including first and second passages associated therewith, said first passage extending from said first side of said plate through a first wall of said port and said second passages extending said second side of said plate and through a second wall of said port, opposite to said first wall;

said first passage being located at a first predetermined distance above said lower surface of said plate and including a threaded portion;

said second passage being located at a second predetermined distance above said lower surface of said plate and including a threaded portion;

a first cylindrical pocket for receiving an end of one of said first and second hollow cylindrical metal tubes; said first cylindrical pocket being located in said second wall of said port at a position coaxially aligned with said first passage and at said first predetermined distance above said lower surface of said plate and extending into said plate a predetermined distance;

a second cylindrical pocket for receiving an end of the other one of said first and second hollow cylindrical metal tubes; said second cylindrical pocket being located in said first wall of said port at a position coaxially aligned with said second passage and at said first predetermined distance above said lower surface of said plate and extending into said plate a predetermined distance;

said open end of said first hollow cylindrical metal tube being received in said first passage and the opposed end of said first hollow cylindrical metal tube being received in said first pocket;

said open end of said second hollow cylindrical metal tube being received in said second passage and the opposed end of said second hollow cylindrical metal tube being received in said second pocket;

said first hollow cylindrical metal tube being angularly positioned with said first and second rows of spray openings being symmetrically positioned relative to a vertical axis through the center of said port;

said second hollow cylindrical metal tube being angularly positioned with said first and second rows of spray openings symmetrically positioned relative to said vertical axis through the center of said port;

a first epoxy seal to secure the periphery of said first hollow cylindrical metal tube adjacent said open end thereof to said first wall of said port and seal any gap between said first passage and said periphery of said first hollow cylindrical metal tube;

a second epoxy seal to secure the remaining end of said first hollow cylindrical metal tube to said second wall of said port and seal any gap between said second wall of said port and the outer periphery of said first hollow cylindrical metal tube;

a third epoxy seal to secure the periphery of said second hollow cylindrical metal tube adjacent said open end thereof to said second wall of said port and seal any gap between said second passage and the periphery of said second hollow cylindrical metal tube;

a fourth epoxy seal to secure the remaining end of said second hollow cylindrical metal tube to said first wall of said port and seal any gap between said first wall and the outer periphery of said second hollow cylindrical metal tube;

a first fitting, said first fitting having a threaded portion for threaded engagement with said first passage for coupling a source of nitrous oxide to said first passage;

a second fitting, said second fitting having a threaded portion for threaded engagement with said second passage for coupling a source of fuel to said second passage;

a first jet, said first jet being received within said first fitting for proving a a passage of a first predetermined diameter through which nitrous oxide from said source of nitrous oxide must pass through to reach said first passage in said plate;

a second jet, said second jet being received within said second fitting for providing a passage of a second predetermined diameter through which fuel from said source must pass through to reach said second passage in said plate;

said plate including an exhaust gas return hole extending through the thickness of said plates and positioned in-between two of said plurality of ports; and said plate further including a plurality of bolt holes for permitting said plate to be secured between said first and second members of said air intake manifold by bolts.

* * * * *